United States Patent [19]

Wada et al.

[11] 4,356,566
[45] Oct. 26, 1982

[54] SYNCHRONIZING SIGNAL DETECTING APPARATUS

[75] Inventors: Ryoichi Wada, Habikino; Takanori Seno; Mitsuharu Tsuchiya, both of Katano, all of Japan

[73] Assignee: Matsushita Electric Industrial Co., Ltd., Osaka, Japan

[21] Appl. No.: 118,220

[22] Filed: Feb. 4, 1980

[30] Foreign Application Priority Data

Feb. 8, 1979 [JP] Japan .................................. 54-13593

[51] Int. Cl.³ .................................................. H04L 7/00
[52] U.S. Cl. .................................... 375/116; 375/113; 370/100; 328/63
[58] Field of Search ............... 375/80, 106, 116, 114, 375/113; 370/100; 235/92 CC, 92 NT, 92 PE, 92 SH; 358/148–153; 360/51; 340/147 SY, 168 S, 147.3 Y, 825; 328/44, 63

[56] References Cited

U.S. PATENT DOCUMENTS

| | | | |
|---|---|---|---|
| 3,586,776 | 6/1971 | Salava | 375/116 |
| 3,654,390 | 4/1972 | Puckette | 375/116 |
| 3,801,956 | 4/1974 | Braun | 375/116 |
| 3,878,383 | 4/1975 | Uchida | 235/92 NT |
| 3,893,033 | 7/1975 | Finch | 328/44 |
| 3,909,724 | 9/1975 | Spoth | 375/116 |
| 3,941,930 | 3/1976 | Mohri | 358/148 |
| 4,099,048 | 7/1978 | Eichenlaub | 235/92 SH |

*Primary Examiner*—Benedict V. Safourek
*Assistant Examiner*—Stephen Chin
*Attorney, Agent, or Firm*—Wenderoth, Lind & Ponack

[57] ABSTRACT

A synchronizing signal detecting circuit for synchronizing digital data receiving equipment is disclosed. Digital signals consisting of data and synchronizing signals obtained by repeating a predetermined pulse pattern many times are fed to a shift register in succession in synchronism with clock pulses. A gate circuit connected to the shift register detects the synchronization pulse pattern. A detector circuit detects a duration period of a coincidence signal which is the output of the gate circuit, and outputs a synchronous detection signal when the duration period of the coincidence signal exceeds the predetermined value. This synchronizing signal detecting circuit can detect synchronizing signals even when data errors are produced to some extent.

5 Claims, 10 Drawing Figures $V_{in}$

HCR

DSY

→ TIME

SYNCHRONIZING SIGNAL DETECTING APPARATUS

BACKGROUND OF THE INVENTION

This invention relates to a synchronizing signal detecting circuit, which is useful for transmitting, recording or reproducing digital signals.

In transmitting digital signals, it is a frequently employed practice to insert synchronizing signals to specify the positions of the data. Predetermined pulse patterns are used as synchronizing signals and are inserted among the data. The receiving side must be equipped with various protective functions so as not to erroneously detect patterns identical to synchronizing signals in a train of data pulses.

On the other hand, when the transmitted or recorded signals contain many errors, the use of a long pulse train as synchronizing signals may often make it difficult to detect coincident patterns.

According to the conventional art, therefore, when PCM (pulse code modulation) codes of audio signals were to be recorded onto or reproduced from a recording medium such as that of video tape recorders (hereinafter referred to as VTR) which introduce many errors, it was accepted practice to insert synchronizing signals obtained by repeating a "1100" pattern many times, and to employ a tank circuit on the receiving side to detect the presence thereof, such that synchronizing signals could be detected even when errors were produced to some extent.

However, the inductance used for the tank circuit was relatively great in size, necessitated adjustment and presented problems in regard to stability.

SUMMARY OF THE INVENTION

It is an object of this invention to provide a synchronizing signal detecting circuit which does not require an inductance of large size for the tank circuit, and does not require substantial adjustment, and which is stable in its operation.

The present invention digitally detects the repetition of the above-mentioned pattern pulses to eliminate the aforementioned defects. Namely, the present invention is to materialize a device for detecting synchronizing signals relying upon a simply constructed circuit maintaining increased stability.

BRIEF DESCRIPTION OF THE DRAWINGS

This invention will be described in detail with the aid of the accompanying drawings, in which.

DESCRIPTION OF THE PREFERRED EMBODIMENTS

As an embodiment of the present invention, mentioned below with reference to the drawings is a synchronizing signal detecting circuit which is applied to a PCM adapter for audio signals using an ordinally helically scanning rotary-head VTR as a recording medium.

Figure 1:
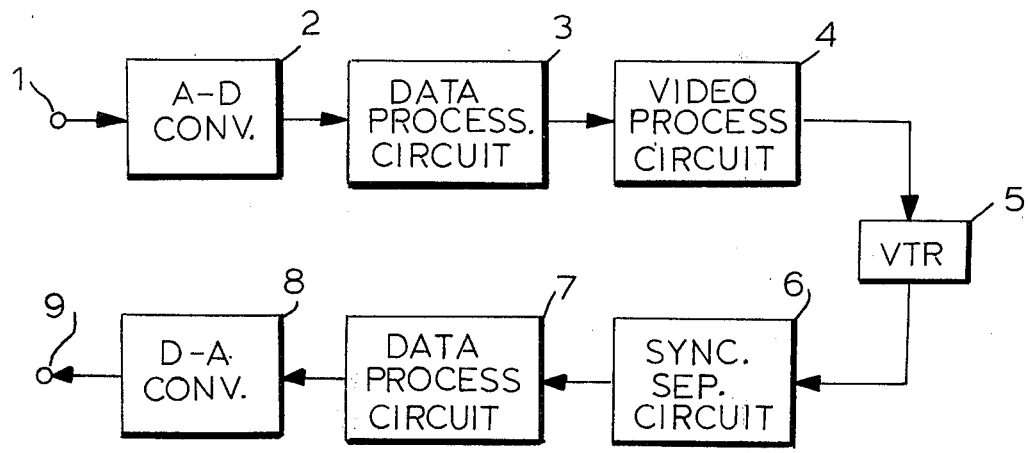
FIG. 1 is a block diagram of a PCM adapter employing a VTR.

FIG. 1 is a diagram illustrating the construction of a PCM adapter, in which analog audio signals fed to an input terminal 1 are converted into digital signals through an analog/digital (A-D) converter 2, and from which is detected errors or to which are added correcting codes, or the signals are subjected to the processing such as interleaving or the like through a recorded data processing circuit 3. The signals are then converted into signals like those of television signals through a video processing circuit 4, and are recorded onto a magnetic tape (not shown) by a VTR 5.

During the reproducing operation, the signals reproduced from the VTR 5 separate the data and synchronizing signals from the PCM codes which are carried by the signals like those of television signals through a synchronous separator circuit 6, and the thus separated signals are subjected to the processing such as de-interleaving or addition of correction codes through a reproduced data processing circuit 7. The signals are then converted into analog audio signals through a digital/analog (D-A) converter 8, and are produced from an output terminal 9.

The details of the PCM adapter employing VTR are not mentioned here since it has been widely known already.

FIG. 2 illustrates vertically synchronizing portions of the signals recorded in the PCM adapter. With the helically scanning VTR, the head is switched at a position several H's before the vertical synchronizing signals in the television signals. Therefore, the PCM data must be recorded so as to avoid a portion where the head is switched. Consequently, in a 1V period consisting of 262.5 H's, the PCM data is recorded using 245 H's, avoiding 17.5 H's which lie before and after the vertical synchronizing signal.

Figures 2A, 2B:
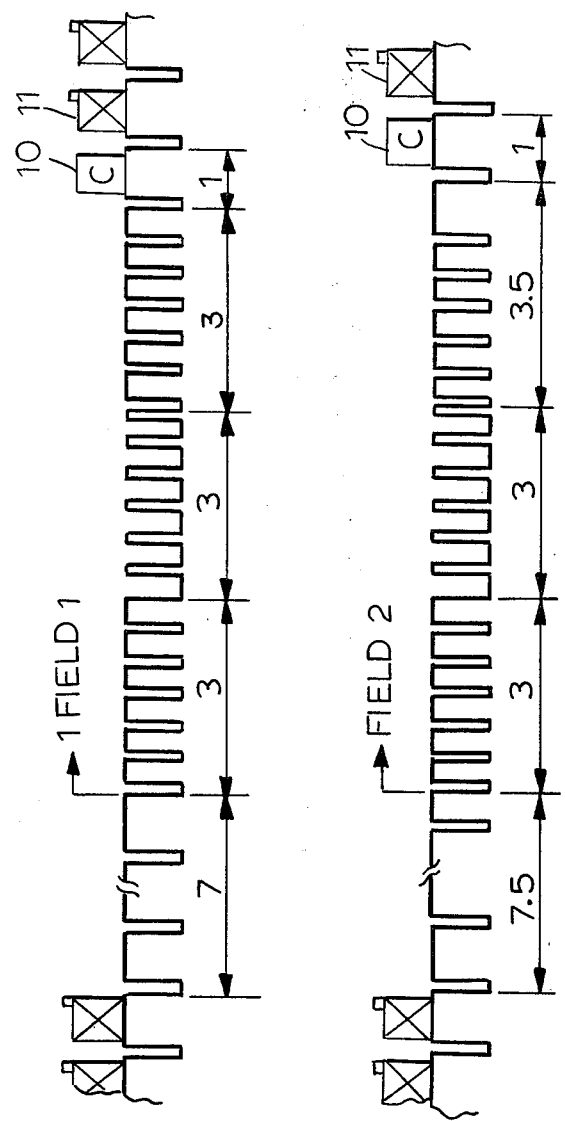
FIGS. 2a and 2b are time charts before and after the vertical synchronizing signal is inserted in the recording signals of the PCM adapter.

FIGS. 2a and 2b illustrate two types of waveforms. Television signals have two fields of an odd number and an even number which are interlacing and which are different by 0.5 H. FIGS. 2a and 2b illustrate these relationships.

Figure 3:
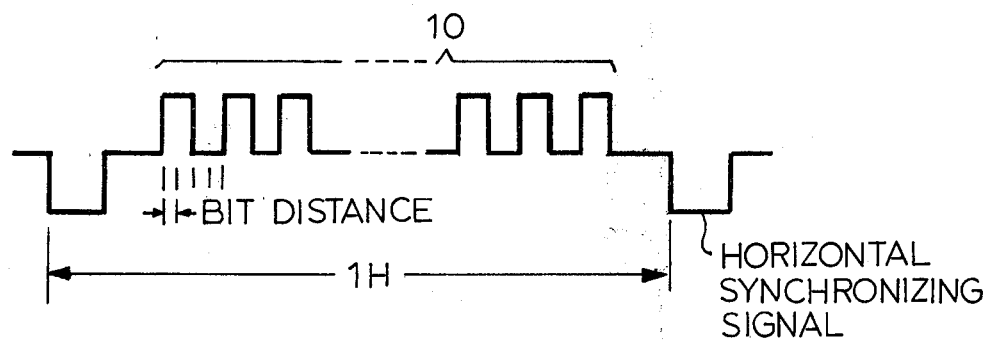
FIG. 3 is a diagram illustrating a waveform of a synchronizing signal.

After the vertical synchronizing period has been finished as shown in FIGS. 2a and 2b, the PCM data are successively introduced following a control word 10. The control word 10 is used for indicating the start of the data after each vertical synchronizing signal is finished. In other words, the control word 10 is a synchronizing signal which indicates the start of the data. FIG. 3 illustrates the control word. As shown in FIG. 3, the control word consists of a repetition of data "1100" of a period of 4 bits that are inserted in a data region.

When information is recorded on a VTR, the portions near the vertical synchronizing signals located at the end of the tape are subject to be out of tracking. With the synchronizing signals of a particular pattern, therefore, such portions are difficult to be found. This is why the pattern is repetitively used. According to the embodiment of the present invention, for example, the pattern "1100" is inserted over 128 bits, i.e., inserted so as to be repeated 32 times.

Figure 4:
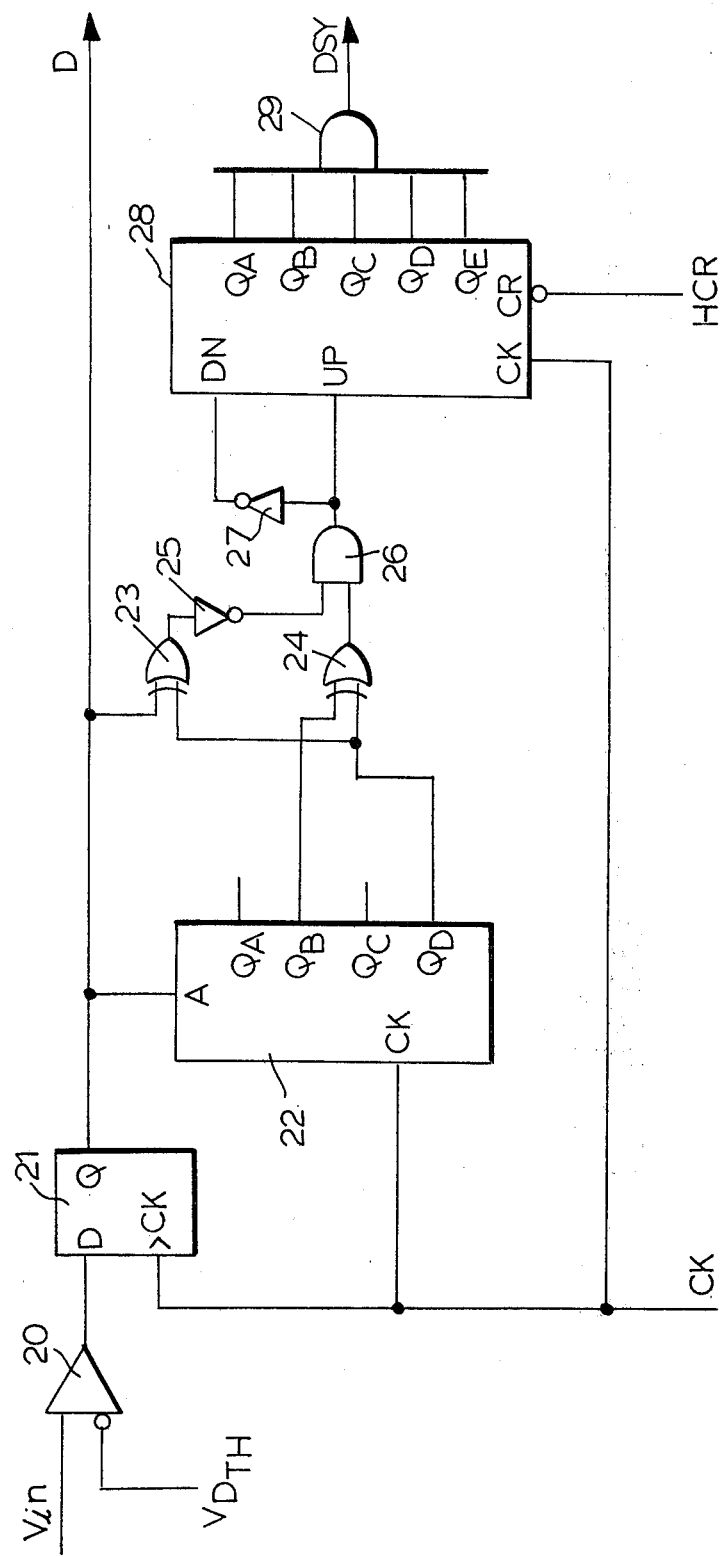
FIG. 4 is a diagram illustrating a circuit setup according to an embodiment of the present invention.
Figure 5A:
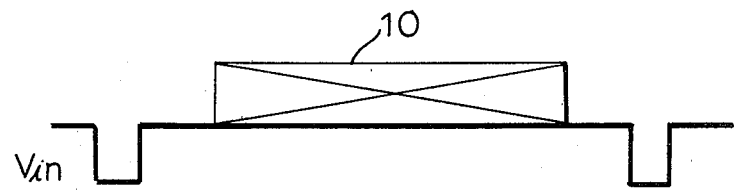
FIGS. 5a–5d are time charts.
Figure 5B:
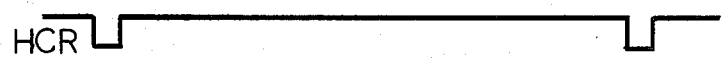
Figure 5C:
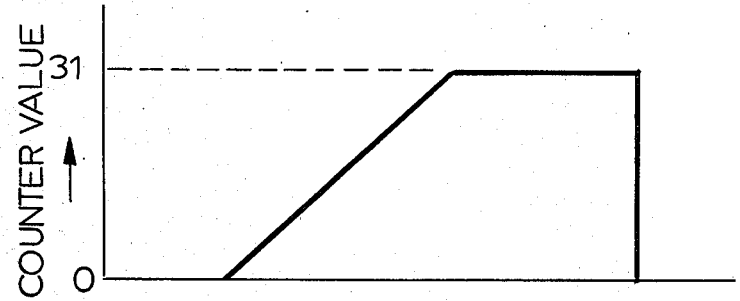
Figure 5D:

FIG. 4 shows a circuit setup according to an embodiment of the present invention which is suited for detecting the synchronizing signals. In FIG. 4, the input signals are compared with a data stamping level $V_{DTH}$ by a comparator 20, judged whether they are of the "1" level or "0" level, and are fed to a flip-flop circuit 21. The data are stamped on a time axis by stamping clocks CK, and are produced as regenerated data D.

The regenerated data are fed to a shift register 22 of 4 bits, which produces data $Q_A$, $Q_B$, $Q_C$ and $Q_D$ which are delayed by 1 bit to 4 bits, respectively. The pattern "1100" is repeated by detecting different codes of the data $Q_D$ and $Q_B$ which are separated by 2 bits, and by detecting the same codes of the data $Q_D$ and input which are separated by 4 bits.

Exclusive OR circuits 23, 24, an inverter 25 and an AND gate circuit 26 work to take the conditions. When the patterns "1100" are continuously introduced, the AND gate circuit 26 continuously produces the output of level "1". An up-down counter 28 which constitutes a detector circuit performs the count-up operation when the output of the AND gate circuit 26 is of the level "1", and performs the count-down operation when the output is of the level "0", i.e., when the output of the AND gate circuit 26 is of a different pattern. Further, the up-down counter 28 is cleared by an HCR signal which is produced for every introduction of a horizontal synchronizing signal. The count-down operation is stopped when the contents of the up-down counter 28 become all "0". The same holds true for the count-up operation, i.e., the count-up operation is stopped when the contents are all "1" or when a value 31 is reached. here, reference numeral 27 denotes an inverter, and 29 denotes an AND gate circuit.

FIGS 5a-5d show time charts of the circuit of FIG. 4. If there is no error in the transmitted signals, the up-down counter 28 which is cleared by the HCR signal performs the count-up operation responsive to the synchronous patterns "1100" which are continuously introduced to the input thereof until 31 bits are counted. At this moment, a synchronous detection signal DSY is fed to the AND gate circuit 29. Even when a portion of the synchronizing signals is lost due to error such as dropout, a synchronizing signal is produced if the number of patterns "1100" is greater than the number of lost bits by 31. According to this embodiment, 128 bits are allotted as synchronziing signals; hence, the synchronizing signals can be detected even when an error is developed having up to a maximum of 48 bits.

In the regions where the data are carried on this portion, on the other hand, it very seldom happens that the number of patterns "1100" is greater than other patterns by 31 bits, Therefore, the erroneous operation in this portion can be neglected.

Figure 6:
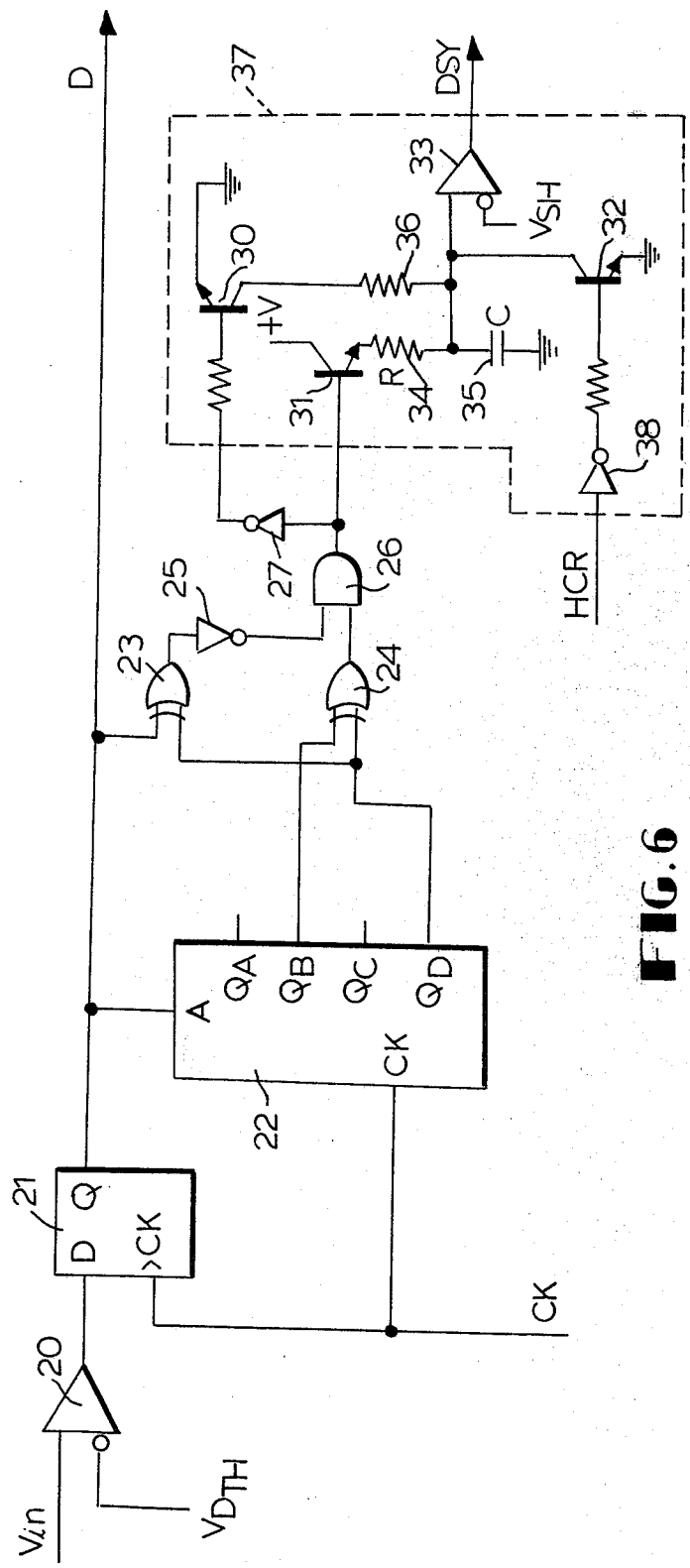
FIG. 6 is a diagram illustrating a circuit setup according to another embodiment of the present invention.

FIG. 6 illustrates a circuit setup according to another embodiment of the present invention, which employs a circuit 37 utilizing the charge and discharge of a capacitor in place of the up-down counter. When synchronous patterns are introduced, the capacitor is charged according to a time constant determined by a resistance R of a resistor 34 and capacitance C of a capacitor 35 through a transistor 31, and the potential across the terminals of the capacitor 35 rises. When the paterns are not in agreement, a transistor 30 is rendered conductive so that the current is discharged through a resistor 36.

Thus, when the potential of the capacitor C exceeds a predetermined value $V_{SH}$, an output appears on the comparator 33. This signal is a synchronous detection signal DSY.

Reference numeral 32 denotes a transistor for reset, which is rendered conductive when the HCR signal is introduced to temporarily short-circuit both terminals of the capacitor 35, and 38 denotes an inverter.

The foregoing description has mentioned the embodiments which deal with the repetition of synchronous patterns "1100". It will, however, be obvious that any other patterns used as synchronizing signals can be treated in the same manner as above if the gate construction in a portion for detecting the coincidence is changed.

The aforementioned embodiments of the present invention employs an up-down counter. The up-down counter, however, may be replaced by an ordinary counter so that it is cleared when non-coincidence is detected. In this case, the circuit will detect the synchronism only when the synchronous patterns of more than 31 bits are continuously introduced. This setup can of course be put into practice.

As will be apparent from the foregoing description, the synchronizing signal detector circuit of the present invention reliably detects synchronizing signals in a digital manner from the transmitted signals containing much error. In other words, the device of the present invention works in a digital manner in contrast with the conventional resonance circuits made up of inductance and the like.

Consequently, the synchronizing signal detector circuit of the present invention is less affected by the temperature, humidity and aging, and exhibits stable operation. Further, the circuitry according to the present invention can be easily integrated to produce the device in compact size, thus presenting various excellent features.

In particular, the synchronizing signal detector circuit of the present invention is suited for use with equipment having transmission paths which contain many errors, for example, for use with PCM recorders and the like.

What is claimed is:

1. A synchronizing signal detecting circuit comprising a shift register which introduces input pulses in succession in synchronism with clock pulses, a gate circuit which detects whether the contents of said shift register corresponds to a fixed predetermined pulse pattern and which procudes a coincidence signal when the contents of said shift register corresponds to said fixed predetermined pulse pattern, and a detector circuit which is connected to said gate circuit and which detects a duration period of said coincidence signal, said duration period corresponding to the period of a fixed predetermined number of said fixed predetermined pulse patterns.

2. A synchronizing signal detecting circuit according to claim 1, wherein said detector circuit comprises an up-down counter which operates by being switched to either one of a count-up or a count-down operation depending upon said coincidence signal.

3. A synchronizing signal detecting circuit according to claim 1, wherein said detector circuit consists of a circuit which electrically charges a capacitor according to a time constant determined by said coincidence signal, and a comparator circuit which compares a voltage across the terminals of said capacitor with a predetermined voltage.

4. A synchronizing signal detecting circuit according to claim 1, 2 or 3, wherein said gate circuit brings the length of the shift register into conformity with the length of a pulse pattern when the synchronous signals are composed of a plurality of predetermined pulse patterns, and wherein said gate circuit further detects the identity of patterns even when said pulse patterns circulate in said shift register.

5. A synchronizing signal detecting circuit according to claim 1, wherein said predetermined pulse pattern is "1100", and when the synchronizing signals consists of: a plurality of repetitions of said pulse pattern, and when an ANDed output of (1) an inverted signal of an exclusive OR output of a first bit and a third bit from the input side of said shift register and of (2) an input signal and a fourth bit becomes a predetermined logic level, said predetermined pulse pattern is produced as a coincidence detection signal.

* * * * *